United States Patent
Makarov et al.

(10) Patent No.: US 12,387,925 B2
(45) Date of Patent: Aug. 12, 2025

(54) ELECTROSTATIC ION TRAP CONFIGURATION

(71) Applicants: Thermo Fisher Scientific (Bremen) GmbH, Bremen (DE); California Institute of Technology, Pasadena, CA (US)

(72) Inventors: Alexander Makarov, Bremen (DE); Dmitry Grinfeld, Bremen (DE); Mikhail Skoblin, Bremen (DE); Michael Roukes, Pasadena, CA (US); Warren Fon, Pasadena, CA (US); Eric Wapelhorst, Bremen (DE)

(73) Assignees: Thermo Fisher Scientific (Bremen) GmbH, Bremen (DE); California Institute of Technology, Pasadena, CA (US)

(*) Notice: Subject to any disclaimer, the term of this patent is extended or adjusted under 35 U.S.C. 154(b) by 430 days.

(21) Appl. No.: 17/823,618

(22) Filed: Aug. 31, 2022

(65) Prior Publication Data
US 2024/0071741 A1  Feb. 29, 2024

(51) Int. Cl.
H01J 49/42 (2006.01)
H01J 49/00 (2006.01)
H01J 49/40 (2006.01)

(52) U.S. Cl.
CPC ........ *H01J 49/425* (2013.01); *H01J 49/0018* (2013.01); *H01J 49/0036* (2013.01); *H01J 49/406* (2013.01)

(58) Field of Classification Search
CPC .. H01J 49/425; H01J 49/0018; H01J 49/0036; H01J 49/406
See application file for complete search history.

(56) References Cited

U.S. PATENT DOCUMENTS 5,206,506 A  4/1993  Kirchner
5,880,466 A  3/1999  Benner
(Continued)

FOREIGN PATENT DOCUMENTS

WO  2006049623 A2  5/2006
WO  2007109672 A2  9/2007
(Continued)

OTHER PUBLICATIONS

D.Z. Keifer, et al., "Charge Detection Mass Spectrometry: Weighing Heavier Things," Analyst 142, 1654-1671 (2017).
(Continued)

*Primary Examiner* — Nicole M Ippolito
(74) *Attorney, Agent, or Firm* — Klarquist Sparkman, LLP

(57) ABSTRACT

An electrostatic ion trap or an array of electrostatic ion traps are provided having a longitudinal length of no more than 10 mm and/or at least one electrode with a capacitance to ground of no more than 1 pF. First and second sets of planar electrodes may be distributed along the longitudinal axis, at least some of the which are configured to receive an electrostatic potential for confinement of ions received in the space between the first and second sets of planar electrodes. An array may comprise an inlet for receiving an ion beam, configured such that a portion of the ion beam can be trapped in each of the ion traps. Signals indicative of ion mass and charge data may be obtained from multiple electrostatic ion traps in the array. This mass and charge data may be combined for identification of components of a mixture of different analyte ions.

31 Claims, 8 Drawing Sheets

(56) References Cited

U.S. PATENT DOCUMENTS

| | | | |
|---|---|---|---|
| 5,886,346 | A | 3/1999 | Makarov |
| 6,762,406 | B2 | 7/2004 | Cooks et al. |
| 7,718,959 | B2 | 5/2010 | Franzen et al. |
| 7,767,960 | B2 | 8/2010 | Makarov |
| 7,985,950 | B2 | 7/2011 | Makarov et al. |
| 8,362,421 | B2 | 1/2013 | Fernandez et al. |
| 8,835,839 | B1 | 9/2014 | Anderson et al. |
| 8,841,611 | B2 | 9/2014 | Li et al. |
| 8,975,578 | B2 | 3/2015 | Green et al. |
| 9,728,384 | B2 | 8/2017 | Verenchikov |
| 9,779,930 | B2 | 10/2017 | Guna |
| 9,812,310 | B2 | 11/2017 | Kovtoun et al. |
| 9,984,861 | B2 | 5/2018 | Giles et al. |
| 10,049,867 | B2 | 8/2018 | Verenchikov |
| 10,199,208 | B2 | 2/2019 | Grinfeld et al. |
| 10,453,668 | B2 | 10/2019 | Continetti et al. |
| 10,593,533 | B2 | 3/2020 | Hoyes et al. |
| 11,227,759 | B2 | 1/2022 | Jarrold et al. |
| 11,232,941 | B2 | 1/2022 | Jarrold et al. |
| 2008/0067349 | A1 | 3/2008 | Moskovets et al. |
| 2022/0068624 | A1 | 3/2022 | Dziekonski |
| 2024/0203718 | A1* | 6/2024 | Hartmer ............... H01J 49/065 |

FOREIGN PATENT DOCUMENTS

| | | |
|---|---|---|
| WO | 2013110587 A2 | 8/2013 |
| WO | 2017062102 A1 | 4/2017 |
| WO | 2017087470 A1 | 5/2017 |
| WO | 2019202338 A1 | 10/2019 |
| WO | 2021061650 A1 | 4/2021 |

OTHER PUBLICATIONS

A.R. Todd et al., "Dynamic Calibration Enables High-Accuracy Charge Measurements on Individual Ions for Charge Detection Mass Spectrometry," J. Am. Soc. Mass Spectrom. 2020, 31, 6, 146-154.

Tolmachev et.al., "Characterization of Ion Dynamics in Structures for Lossless Ion Manipulations," Anal. Chem. 86 18 9162-9168 (2014).

J.S. Brodbelt, et al., "Ultraviolet Photodissociation Mass Spectronmetry for Analysis of Biological Molecules," Chem. Rev. 120, 7, 3328 (2020).

* cited by examiner

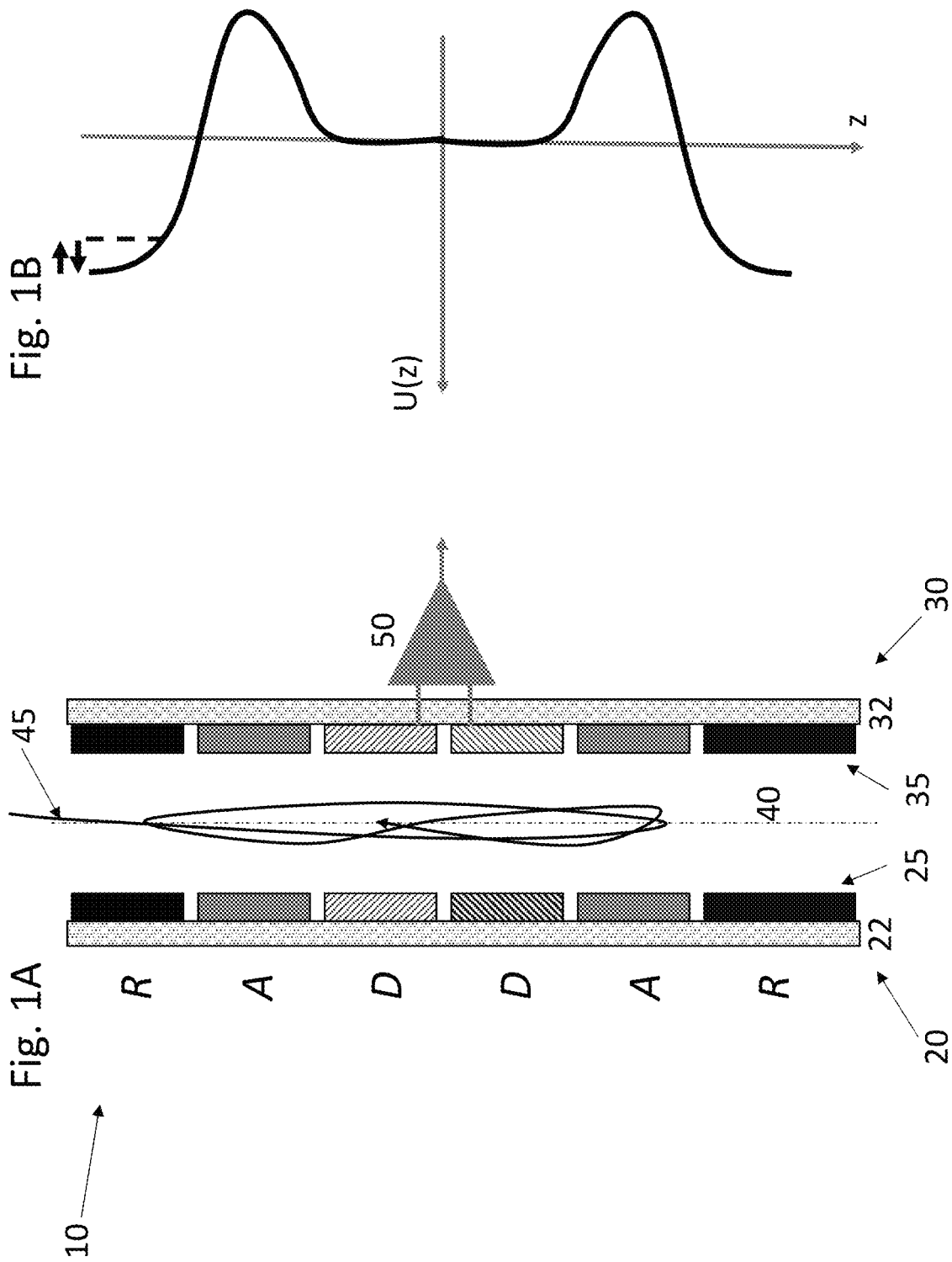

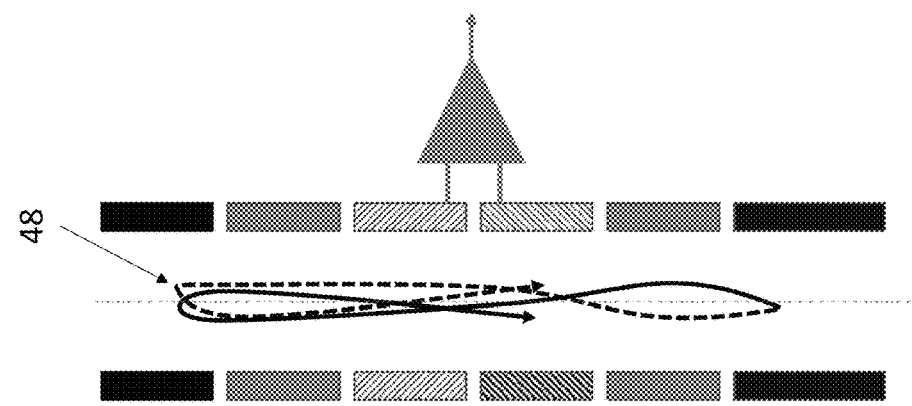
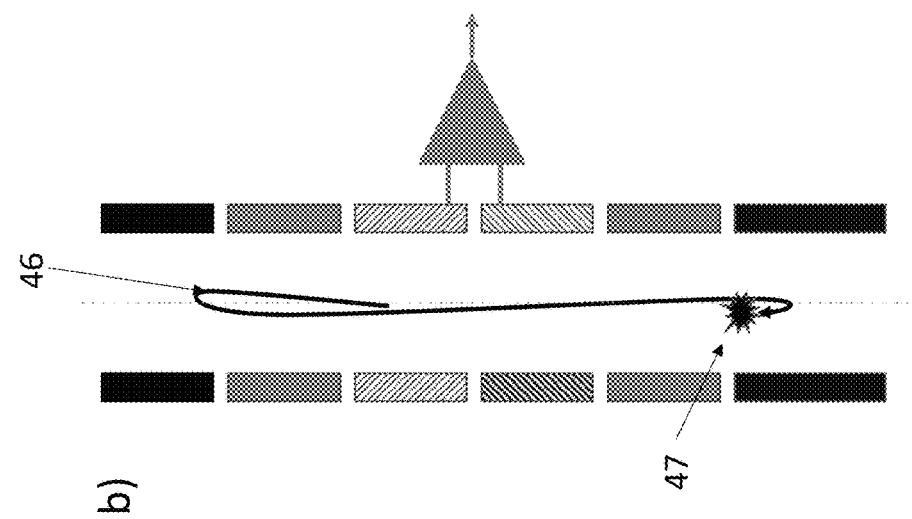
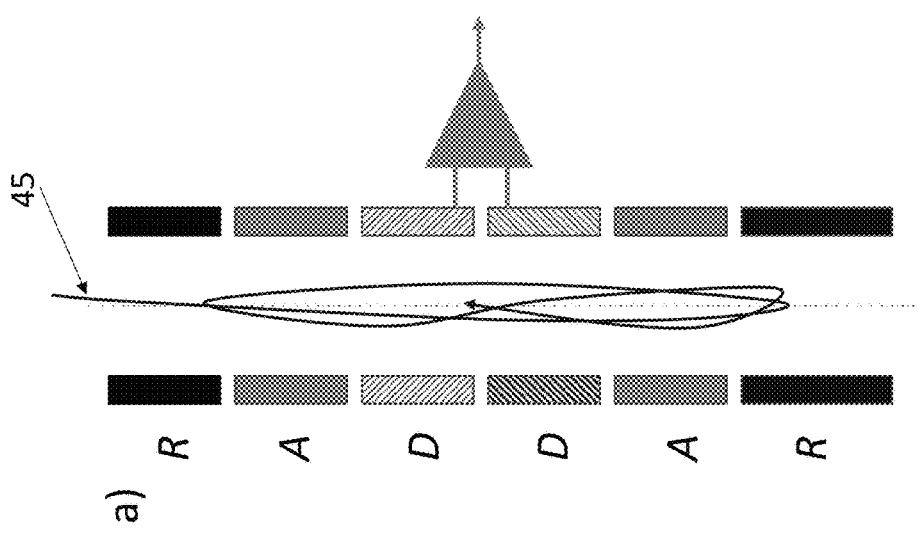
Fig. 5

ELECTROSTATIC ION TRAP CONFIGURATION

TECHNICAL FIELD OF THE DISCLOSURE

The disclosure concerns electrostatic ion traps, arrays of electrostatic ion traps and methods of analyzing an ion beam.

Background to the Disclosure

High-resolution accurate-mass (HR/AM) analyzers utilizing electrostatic fields are well known. These include: Multi-reflection Time-of-Flight (mrTOF) analyzers with destructive ion detection (for instance, using secondary electron multipliers) including those described in WO2013110587, WO2019202338, WO2017087470 and references therein; orbital trapping mass analyzers, including those described in U.S. Pat. Nos. 5,886,346, 7,767,960, 7,985,950; and electrostatic ions traps with closed and open trajectories, including those described in U.S. Pat. Nos. 5,880,466, 9,728,384, U.S. Ser. No. 10/453,668 and D. Z. Keifer, et al., Analyst 142, 1654 (2017).

Orbital trapping mass analyzers and some other electrostatic ions traps use image current for non-destructive detection of ions. With sufficiently low capacitance of detection electrodes and transistors of a preamplifier, it is possible to detect individual ions over prolonged duration of detection. This is practiced in, for example, charge detection mass spectrometry (CDMS), as described in U.S. Ser. No. 11/232,941, U.S. Ser. No. 11/227,759, US2022068624. Recently, detection of a single elementary charge was demonstrated by A. R. Todd et al J. Am. Soc. Mass Spectrom. 2020, 31, 146-154.

Existing HR/AM analyzers are limited in their productivity by a few tens to few hundred spectra per second. For efficiency reasons, as many species as possible are thus crowded in a single MS or MS/MS spectrum, up to the limit of space charge. Space charge effects may ultimately limit the dynamic range and depth of analysis.

As a result, such analyzers can identify no more than 10 to 100 of the most abundant species per second. Although this level has drastically increased over the last several years, due to broad adoption of fast liquid chromatography and data-independent acquisition (DIA), new approaches are needed for the next jump of productivity, especially in proteomics.

Recent breakthroughs in the informatics foundations of DIA, including adoption of machine learning, have dramatically improved the reliability of deconvolution of mixed spectra into individual fragment spectra. This approach may work reliably for the most intense components of mixed spectra, but cannot be applied to species at the lower end of the dynamic range, as they are represented just by a few ions. This eventually limits the depth of analysis, especially in proteomics, where dynamic range of concentrations could span over 10 to 12 orders of magnitude. The problem is even more acute in single-cell proteomics, where the total number of peptides available for analysis is limited to a few billions per cell, with only a few hundred million ions actually entering a mass spectrometer.

Different techniques for enrichment have been tried either on the sample preparation side (Seer, fractionation) or ion sorting side (for instance, as shown in U.S. Pat. No. 9,812,310, U.S. Ser. No. 10/199,208). These typically work by creating a number of fractions that afterwards need to be analyzed either individually or in pools. Performance appears to be improved by these approaches, but not equally well for all species, thus leaving a number of low-abundance species unrepresented or even lost in the process. Meanwhile, individual analysis of fractions in the same mass analyzer reduces throughput proportionally, as a mass analyzer is essentially a single-channel device.

Arrays of mass analyzers have been considered to address this throughput problem. Arrays of electrostatic ion traps have been studied extensively, including for example, U.S. Pat. Nos. 5,206,506, 7,718,959, US2003089846, U.S. Pat. No. 6,762,406, WO2006049623, U.S. Pat. No. 9,779,930, WO2021061650 and U.S. Pat. No. 7,985,950 (in the form of orbital trapping mass analyzers). Arrays of some other analyzers have also been considered, for instance U.S. Pat. No. 7,985,950, U.S. Ser. No. 10/049,867, U.S. Ser. No. 10/593,533, US2008067349. All of these transport ions across three dimensions to make the overall multi-analyzer mass spectrometer space efficient. Nonetheless, high-resolution, accurate-mass capabilities have proved difficult in such arrays because of inherent limitations on electrode accuracy.

Improvements in electrostatic ion traps and arrays of mass analyzers are desirable to address these challenges.

SUMMARY OF THE DISCLOSURE

Against this background, there is provided an electrostatic ion trap according to claim 1, an array of electrostatic ion traps in line with claim 22 and a method of analyzing an ion beam comprising a mixture of different analyte ions as defined by claim 28. Preferred and/or optional features are disclosed in the dependent claims.

A new type of microscale electrostatic ion trap (µEST) is proposed, with a typical length of the trap being no more than 10 mm and optionally no more than 5 mm, 2 mm, 1 mm or 0.5 mm. Additionally or alternatively, the capacitance of at least one of the electrodes (in particular, a detection electrode) to ground is no more than 1 pF. The µEST advantageously has planar electrodes distributed along a longitudinal axis (z-dimension). Each electrode extends perpendicular to the longitudinal axis (in a width or x-dimension). One set of electrodes distributed along the longitudinal axis is spaced from a second electrode set (also parallel to the longitudinal axis) to define a trapping region between the electrode sets (and defining a height or y-dimension). Electrostatic potentials are applied to at least some of the electrodes for confinement of ions received in the trapping region. For improved field, the two electrode sets may mirror one another in their configuration. Implementation of the trap electrodes on a sub-millimeter scale, preferably with nanometer tolerance, allows high resolution. The µEST may have controller, to configure its operation or a group of µESTs may share a controller. A controller may comprise a processor and computer program configured to operate on the processor.

Due to its small size and use of electrostatic potentials for ion trapping, the µEST permits confinement of a small numbers of ions, generally no more than 100, 50, 30, 20, 10, 5 or even a single charged particle in a small space. Nevertheless, high-resolution accurate-mass analysis is possible. New types of ion analysis therefore become possible. A measurement time of no more than 20 ms and/or an acceleration voltage of no more than 200V and/or a gas pressure within the electrostatic ion trap of no more than $10^{-7}$ mbar may be achieved. Moreover, the µEST can be manufactured efficiently and cost-effectively, for example using lithographic techniques. The µEST could be formed as part of an integrated circuit. Modern micro- and nanolithographic technologies may allow nanometer tolerances to be achieved on planar wafers.

One or more of the electrodes (typically towards the center of the trap along the longitudinal axis) is used for ion detection, by an induced image current. Reliable image current detection of single elementary charges is enabled by the microscale design of the trap. As noted above, the capacitance of one, some or each detection electrode to ground is kept low, typically no more (or less) than 1 pF, 500 fF, 100 fF, 50 fF, 10 fF, 5 fF or 1 fF. Such a low capacitance may permit single-charge detection. A transistor (for instance a FET or JFET) may be connected to the detection electrode or electrodes, which may also be formed lithographically.

Some of the electrodes (typically the outer electrodes) may be used for reflection of the ions, by application of a suitable potential. Other electrodes, generally between the reflecting electrodes and the detection electrodes may receive a suitable potential for accelerating the ions. By reducing the potentials on the reflecting electrodes, ions may be permitted to enter the trap. The potentials on the reflecting electrodes may then be raised to confine the ions to the trapping region. A gap between adjacent electrodes in the longitudinal (or z) dimension is generally no more than 100 µm, preferably no more than 50 µm and typically much smaller, for example no more (or less) than 20 µm, 10 µm or 5 µm. A spacing (for instance, free space) between electrodes on different planes (in the height or y-dimension) is generally no more or less than 100 µm and typically no more or less than 80 µm or 70 µm.

Each set of electrodes may be formed on a respective planar substrate (for instance, a wafer). To form the µEST, the two substrates may be positioned, such that the electrodes oppose one another. A spacer (or multiple spacers) may separate the sets of electrodes (or substrates or wafers). The spacer or spacers may include conductive spacers, for electrical coupling of electrodes.

In some embodiments, the arrangement of each set of electrodes is substantially symmetrical between opposite sides of a center of the electrostatic trap along the longitudinal axis (z=0 line). Additionally or alternatively, one or both edges of at least some of the electrodes in the longitudinal axis has an arc shape. For example, some of the electrodes may have a curved shape, an arc shape, a circular shape or an elliptical shape. The curved shape permits improved containment of ions when using planar electrodes.

Fragmentation of ions within the µEST is possible. For example, this may be achieved by emission of a pulse from a UV or IR laser at the trapping region. The laser may emit the pulse in a direction orthogonal to longitudinal axis (that is, along the width dimension of the trap). A single laser pulse timed to match a trajectory of a target ion or multiple, unsynchronized laser pulses may be used. Light-based fragmentation techniques are known in the art. Their application to a µEST allows matching emittance of the laser to requirements of fragmentation.

The µEST may therefore be operated to confine one or more precursor ions in the trapping region (which may first be analyzed and/or selected), fragment the one or more precursor ions and then detect the fragment ions. MS/MS operation is thus possible both in data-dependent (DDA) and data-independent (DIA) acquisition modes. These steps may be repeated to provide $MS^n$ operation. The use of non-destructive image current detection permits multiple-stage analysis of a single individual ion. Data-dependent decision ion fragmentation is also possible, by controlling subsequent fragmentation based on previous detection.

In another aspect, an array of microscale electrostatic ion traps (µESTs) may be provided, each ion trap having a longitudinal length of no more than 10 mm and/or at least one electrode (preferably, a detection electrode) with a capacitance to ground of no more than 1 pF. Each µEST can therefore analyze a small number of ions, but with a large array, parallel analysis on a significant scale is possible. Overall throughput and sensitivity can thereby be improved. Optionally, the capacitance of one, some or each detection electrode to ground is kept low, typically no more (or less) than 1 pF, 500 fF, 100 fF, 50 fF, 10 fF, 5 fF or 1 fF.

The array typically has an inlet for receiving an ion beam and a portion of the ion beam may be trapped in each of the µESTs. Each µEST of the array typically has a design according to the general details discussed above. Such an array may be especially useful for peptide analysis, as will be discussed below. The same calibration mixture may be used for calibration of multiple µESTs of the array.

In particular, the array may have a geometry based on one or more parallel planes, each plane being defined by two opposing substrates (wafers), having electrodes formed thereupon to oppose one another and thereby define one or more µEST in the same plane. In other words, traps may be formed using parallel wafers, stacked in multiple levels to achieve massively parallel operation. This may be advantageous, because a single laser pulse may be able to fragment ions in multiple trapping regions. Additionally or alternatively, three or more substrates may define multiple distinct planes, each with one or more µEST. Where fragmentation is caused by a UV or IR laser, a splitter arrangement may be used for spatially dividing the laser pulse output to the different planes. A lens array (particularly using miniature lenses, optionally with anti-reflective coating) may then focus each part of the pulse into a respective collimated beam.

In operation, ions from a single ion beam may be distributed to multiple µESTs of the array, which may then process the received ions in parallel. Statistical and/or machine-learning methods may be applied to the detection outputs from the µESTs. This may assist in identification of a composition of the single ion beam. Optionally, a chromogenic tag or a tandem mass tag are used to improve analysis.

A further aspect may be considered in relation to analyzing an ion beam comprising a mixture of different analyte ions. Ions from the ion beam are directed to multiple electrostatic ion traps of an array of electrostatic ion traps. Each trap has a longitudinal length of no more than 10 mm (and preferably smaller, as discussed above) and/or at least one electrode (preferably, a detection electrode) with a capacitance to ground of no more than 1 pF (and preferably smaller, as discussed above). Mass and charge data in respect of the ions can then be obtained (for example by analysis of the ions and/or derivatives of the ions) from the multiple traps, preferably by at least some simultaneous analysis. The mass and charge data can be combined to identify components of the mixture. This process may be performed by computer control and can be implemented in a computer program, for execution by a processor configured to control such an array of electrostatic ion traps or a mass spectrometer comprising such an array.

Advantageously, the ions (and/or their derivatives) can be fragmented in the traps. The precursor ions and/or fragment ions can be analyzed, advantageously to obtain mass and charge data from multiple traps and multiple degrees of fragmentation. This MS/MS operation can be extended to $MS^n$ operation by repeated fragmentation, as discussed above. Other features and/or aspects discussed herein may also be implemented within this approach.

According to all aspects of the disclosure, higher productivity, sensitivity and dynamic range are possible. Combinations of aspects and/or features from within aspects are possible. Further benefits may be attained by combining aspects of the disclosure with ion sorting devices (for example, ion mobility analysis followed by an ion trap array).

BRIEF DESCRIPTION OF THE DRAWINGS

The disclosure may be put into practice in a number of ways, and preferred embodiments will now be described by way of example only and with reference to the accompanying drawings, in which:

FIG. 1A schematically shows a basic design for a µEST according to an embodiment;

FIG. 1B shows an example distribution of potentials along the z dimension for the µEST of FIG. 1A, for injection of ions;

FIG. 5 schematically depicts a µEST in three consecutive steps of operation;

DETAILED DESCRIPTION OF EMBODIMENTS

Figure 2A:
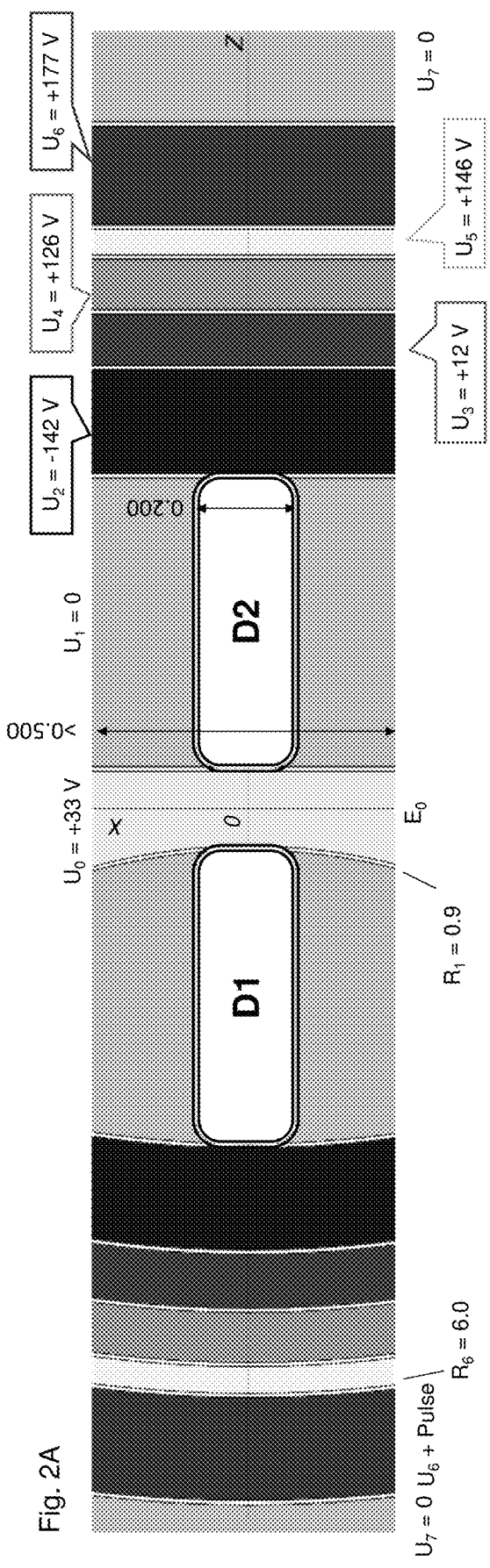
FIG. 2A shows a schematic diagram of a second embodiment of µEST in the plane of one set of electrodes.

The disclosure provides a new type of electrostatic ion trap, having a longitudinal length of no more than (and preferably less than) 10 mm. This is termed a micro-scale electrostatic trap (µEST) and in some implementations, the longitudinal length may even be no more than (or less than) 5 mm, 2 mm, or 1 mm. Such an electrostatic ion trap can be formed by a set of planar electrodes, preferably two sets of opposing planar electrodes (parallel to each other). Such electrodes can reliably be formed with nanometer tolerance, for example using lithographic techniques. A µEST may thus be adapted for confinement and/or analysis of small numbers of ions, for instance less than 10 or even a single ion. Advantageous designs of µESTs will be discussed further herein.

The use of electrostatic potentials for trapping and/or analysis allows high-resolution accurate mass analysis. Non-destructive and reliable detection is possible by image current measurement, even allowing detection of single elementary charges. The latter is facilitated by the small size of the µEST. Indeed, an image current signal V induced by a charge q is proportional to q/C, where C is the capacitance between detection electrodes (which in turn, is broadly proportional to the size of the detection electrodes). For detection electrodes smaller than 1 mm, this results in image current signal V in the µV range (that is, less than 1 mV and typically significantly less than 1 mV, but generally higher than 100 nV). Keeping the capacitance of the detection electrodes to ground less than 1 pF and typically significantly smaller (for example, 500 fF, 100 fF, 50 fF, 10 fF, 5 fF or 1 fF) is advantageous. Meanwhile, the noise of modern transistors used to amplify the signal from those detection electrodes could be made well below 10 nV/√Hz. Also, the capacitance of those transistors could be also made below (or at least in the order of) the detection electrode capacitance C.

The inventors have realized that with such a low noise level, it is possible to achieve acquisitions within a time duration of 10 ms to 100 ms with the accuracy of charge determination better than one elementary charge ($\bar{e}=1.602*10^{-19}$ Coulomb). This allows not only determination of mass-to-charge ratio of ions, but also their charge and hence their mass directly, without the use of isotopic distribution, for example. This in turn opens opportunities for high-throughput analysis of individual ions.

An array of µESTs offers the opportunity to analyze large numbers of ions at the same time, without the limitation of a single channel and without a large volume for the instrument. Particularly beneficial designs of µEST permit space efficient arrays and may also allow parallel fragmentation of ions, as will be described below. MS/MS and MS" analysis is also possible thereby.

The disclosure thereby essentially overcomes the issues due to the single-channel nature of HR/AM mass spectrometers. Operating large numbers (for instance, thousands) of µESTs in parallel, each with a throughput of 10 to 100 analyses per second permits new modes of operation. For example, multiple fractions may be pre-separated by such ion storage arrays. Higher specificity of analysis is also possible.

This approach is distinct from known micro-scale RF traps. These include U.S. Pat. Nos. 8,362,421, 8,835,839, Tolmachev et. al., Anal. Chem. 86 18 9162-9168 (2014), WO2017062102, U.S. Pat. Nos. 9,984,861, 8,975,578, 8,841,611. Although the dimensions of the ion trap may be similar to those described herein (and some of the manufacturing techniques may overlap), the structure of the traps are different and different voltages are applied.

Referring first to FIG. 1A, there is schematically shown a basic design for a µEST according to an embodiment. The µEST 10 comprises a first set of electrodes 20 and a second set of electrodes 30. Both the first set of electrodes 20 and the second set of electrodes 30 are planar. For example, the first set of electrodes 20 may comprise a substrate 22 (for instance, a wafer) and electrodes 25 formed on the substrate 22 (for instance, using lithographic techniques). Similarly, the second set of electrodes 30 may comprise a substrate 32 (which may also be a wafer) and electrodes 35 formed on the substrate 32. The electrodes 25 and electrodes 35 are elongated in a plane perpendicular to that of the drawing (in other words, extending in a width dimension). The height and sometimes the width are typically smaller (and preferably significantly smaller) than the length. The use of two opposing sets of electrodes D may provide high quality of electric field.

A longitudinal axis 40 of the µEST 10 is also shown (which may be considered to define a 'z' dimension). The electrodes 25 and electrodes 35 can therefore be considered as distributed along the longitudinal axis 40, with their width dimension (along a 'x'-axis) thus being perpendicular to the longitudinal axis 40 (and not entirely in the plane of the drawing). As noted above, a maximum length of the μEST 10 along the longitudinal axis is no more than 10 mm, preferably no more than 2 mm and more preferably no more than 1 mm. The gap between the two sets of electrodes 20, 30 defines a height dimension (along a 'y'-axis), which may be set by the use of precision spacers (not shown).

The electrodes 25 and electrodes 35 each have respective functions, with opposing electrodes of the first set of electrodes 20 and the second set of electrodes 30 having the same function. The two central electrodes D are used for ion detection. At least some of the electrodes are configured to receive an electrostatic potential for confinement of received ions. The outermost electrodes R are used for reflection of ions (ion mirrors) and a suitable DC potential is applied to these. The electrodes between the detection electrodes D and the reflection electrodes R are acceleration electrodes A, to which a suitable electrostatic potential is applied for accelerating the ions and for their spatial focusing. An example ion trajectory 45 is shown, with the ions thereby being confined within a trapping region of the μEST 10, formed in the gap between the first set of electrodes 20 and the second set of electrodes 30.

Referring next to FIG. 1B, there is shown an example distribution of potentials along the z dimension for the μEST of FIG. 1A, for injection of ions. In this mode of operation, a voltage on the entrance of the trap (applied to the reflection electrodes R) is reduced to let in a short packet of ions of interest (which optionally might be mass pre-selected). The voltage applied to the reflecting electrodes R is then elevated to a reflecting level before ions return back to the entrance, to provide a trapping mode. In FIG. 1A, injection is shown as done from the top along the z-axis. After the voltage applied to the reflection electrodes R is increased (such that the trap is closed) and the ion trajectory is stabilized, detection takes place using the detection electrodes D. An on-chip differential amplifier 50 receives the image current from the detection electrodes D. The resulting signal is routed towards multiplexing and signal processing electronics, some of which may be off-chip. For example, part of the signal processing could be also implemented on the same circuitry, with remaining part (or parts) of the signal processing carried out on an application-specific integrated circuit (ASIC) or field-programmable gate array (FPGA).

Detection is thus carried out non-destructively based on image current and therefore multiple stages of mass analysis become possible, as will be discussed further below. The small size of the trap (with a typical gap between electrodes being less than 50 to 100 μm) facilitates a significantly lower capacitance for the detection electrodes than in existing electrostatic traps. This enables single-charge sensitivity and also allows simultaneous measurement of both charge and mass-to-charge ratio of individual ions. In this respect the electrostatic trap may be considered similar to, for example, a Cone-trap as described in D. Z. Keifer, E. E. Pierson, M. F. Jerrold, Analyst 142, 1654 (2017), but features much higher sensitivity and greater independence of the oscillation period on the initial parameters of incident ions.

Using a trap scaled to sub-millimeter dimensions (as shown in FIG. 2) yields oscillation frequencies approximately in the range of 1 to 10 MHz. This enables resolving powers in the range of 30,000 to 100,000 to be achieved with less than 20 ms measurement times for peptide ion acceleration of 100 to 200 V. For this, a mean free path of greater than 100 m can be achieved with vacuum of less than $10^{-7}$ mbar ($10^{-5}$ Pa). It may be understood that the frequency spread and hence accuracy of mass determination of the ions of interest is related to the tolerance of the design (flatness, parallelism, line accuracy, etc.). The exact relationship may depend on the beam and optics.

In a general sense of the disclosure and according to one aspect, there may be considered an electrostatic ion trap, comprising: a first set of planar electrodes distributed along a longitudinal axis of the ion trap; and a second set of planar electrodes distributed along the longitudinal axis of the ion trap, each of the electrodes of the second set arranged to be spaced apart from and oppose a corresponding electrode of the first set. A length of the first and second sets of planar electrodes along the longitudinal axis is advantageously no more than 10 mm (and optionally no more than 5 mm, 2 mm, 1 mm or 0.5 mm). Additionally or alternatively, a capacitance of at least one of the electrodes (preferably, one, some or each detection electrode) to ground is no more than 1 pF. Beneficially, at least some of the electrodes of the first and second sets are configured to receive an electrostatic potential for confinement of ions received in the space between the first and second sets of planar electrodes. The electrostatic ion trap may be configured to receive no more than 100 (optionally 50, 40, 30, 20, 10 or 5) ions injected into the electrostatic ion trap and preferably, the electrostatic ion trap is configured to receive a single ion injected into the electrostatic ion trap. A controller and/or processor may be provided to control operation of the electrostatic ion trap and/or to receive one or more outputs from the electrostatic ion trap. A computer program comprising instructions to implement a method of operation as herein disclosed may be configured to operate on such a processor.

A corresponding method of manufacturing and/or operating such an electrostatic ion trap may also be considered (for example, including a method of analyzing an ion beam), having steps of forming and/or providing and/or using the features of this device. For instance, the first and second sets of electrodes may be manufactured by lithographic techniques.

Preferably at least one of the electrodes (and more preferably some of the electrodes) is a detection electrode, configured to detect an image current of confined ions. By use of such a small electrostatic trap size (as discussed above), detection of image current is possible with resolution better than 1 elementary charge. The detection electrode or electrodes may be located toward the center of the ion trap along the longitudinal axis. The capacitance of one, some or each detection electrode to ground is advantageously kept low, typically no more than 1 pF, 500 fF, 100 fF, 50 fF, 10 fF, 5 fF or 1 fF. This may be implemented and/or advantageous even without a longitudinal length of no more than 10 mm, although the parameters may be closely connected.

In an embodiment, some of the electrodes are reflecting electrodes, configured to receive a reflecting potential. The reflecting electrodes are beneficially located at the ends of the ion trap along the longitudinal axis. In embodiments, the potentials on the reflecting electrodes are configured selectively to be at: a lower level, to allow ions to enter the ion trap; and a higher level, to confine the ions to the ion trap.

Optionally, some of the electrodes are accelerating electrodes, configured to receive an accelerating potential. The accelerating electrodes are preferably located between the reflecting electrodes and the detecting electrodes along the longitudinal axis.

Advantageously, the first set of electrodes are formed on a first planar substrate. In embodiments, the second set of electrodes are formed on a second planar substrate opposing the first planar substrate. The first and second substrates may form part of an integrated circuit. A gap between adjacent electrodes is preferably no more than 500 μm, 200 μm or 100 μm (and more preferably no more than 50 μm). One or more spacers may be provided between the first and second sets of electrodes. This may define a height of the device.

In embodiments, the arrangement of the first set of electrodes is substantially symmetrical between opposite sides of a center of the electrostatic trap along the longitudinal axis. Additionally or alternatively, the arrangement of the second set of electrodes is substantially symmetrical between opposite sides of a center of the electrostatic trap along the longitudinal axis.

The electrostatic ion trap may be configured such that one or more of: a measurement time is no more than 20 ms; an acceleration voltage is no more than 200V; and a gas pressure within the electrostatic ion trap is no more than $10^{-7}$ mbar.

Details of specific embodiments will now be discussed. Further description according to this general sense and other general senses of the disclosure will be provided below.

In practice, more complex electrode configurations than those shown in FIG. 1A may be employed to provide more optimized μEST properties with reduced spatial and time-of-flight aberrations. In this respect, reference is next made to FIG. 2A, in which there is shown a schematic diagram of a second embodiment of μEST in the plane of one set of electrodes (using the dimensions discussed with reference to FIG. 1A, xz plane, y=0). Reference is also made to FIG. 2B, showing the embodiment of FIG. 2A in a perpendicular plane (yz plane, x=0). Both FIGS. 2A and 2B are annotated with dimensions, which are all in mm, and further annotated with voltages (voltages and dimensions are rounded to the nearest digit).

Figure 2B:
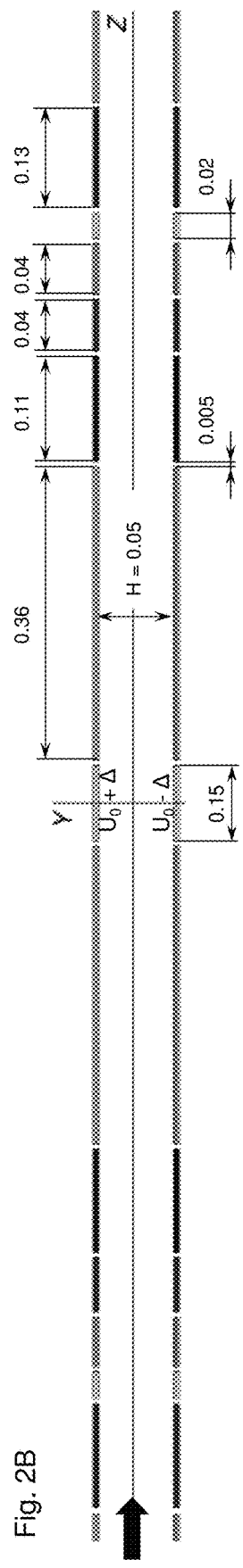
FIG. 2B shows the embodiment of FIG. 2A in a perpendicular plane.

The design shown in FIGS. 2A and 2B differs from that shown in FIG. 1A in a number of respects. First, a larger number of electrodes are provided, including a central electrode $E_0$ between the central detection electrodes (D1, D2). Second, the shape of the electrodes differs. The electrodes on one side of the z=0 line have a generally rectangular shape (in the xz plane), whereas the electrodes on the other side of the z=0 line have shapes that are defined by arcs. The central electrode $E_0$ has an edge on one side of the z=0 line that is defined by a straight line and an edge on the other side of the z=0 line defined by an arc. This central electrode $E_0$ acts as a curved lens, with some of the other curved electrodes having a mirror function. Nonetheless (and as can be seen from FIG. 2B), the arrangement of the electrodes on both sides of the z=0 line is otherwise symmetric. As is shown in FIG. 2B, the gaps between all electrodes are 0.005 mm.

The edge of the central electrode $E_0$ defined by an arc and the adjacent edge of the detection electrode D1 are both defined by concentric circles, centered at z=−1. The radius of the edge of the detection electrode D1 is indicated as $R_1$. The edges of all of the other electrodes on that side of the z=0 line (except for the far edge of the end electrode) are defined by concentric circles, centered at z=+5.3. The radius of the edge of the sixth electrode nearest the z=0 line is also indicated as $R_6$. The central electrode or curved lens $E_0$ and the curvature of the electrodes in the z<0 part of the design (left side) keeps the ions along the z-axis. Otherwise, the ions may drift in the x-direction (along the width of the trap). In addition, the curvature of the central electrode or curved lens $E_0$ may compensate for TOF aberrations from the curvature of the electrodes on the left. This curvature may allow containment of ions in the X-direction, preferably well within the x-dimension of detection electrodes D1 and D2. Instead of curvature, additional electrodes above and below of FIG. 2A could be also used (not shown), providing such containment by fringing fields.

The DC voltages applied to the electrodes are also shown. These voltages are applied symmetrically to electrodes on either side of the z=0 line and also symmetrically to opposing electrodes of the two sets, with the exception of the potential $U_0$ applied to the central electrode $E_0$ that has an opposing offset (labelled ±Δ) applied to the opposing electrodes for tuning.

Symmetry of the power supplying electrodes with respect to each trap is desirable (these are not shown, but typically are adjacent the far edges of the shown electrodes in the x-dimension and extending in the z-dimension), at least where the trap width in the x-dimension (width) is not more than 8 times h (where h is the height of the trap in the y-dimension, in this example 60 μm). Otherwise, an uncompensated ion drift could appear in this direction, which could distort the time-of-flight. This may be particularly relevant in a variant implementation, in which only electrodes without curvature are used (for example, as on the right side of FIG. 2A, where z>0 and mirroring this on the left side). In this case, fringing fields may be used to limit ion motion along the x-dimension.

The configuration shown in FIGS. 2A and 2B thus shows a more advanced planar μEST geometry that constraints ions in all directions, at the same time providing resolving power of up to 100,000 (or mass accuracy below 10 ppm) for ions with energy spread +/−1% within an incoming beam that occupies 40% of the gap between electrodes. This geometry may be seen to combine planar electrostatic mirrors with curved mirrors and a curved cylindrical lens in the middle.

In operation, ions oscillate between the electrodes receiving the $U_6$ potential. The electrode receiving the $U_2$ potential is the accelerating electrode. The electrodes receiving the potentials $U_3$, $U_4$ and $U_5$ are finely tuned to reduce or minimize higher-order aberrations both for spatial and time-of-flight focusing. This may allow mass resolution that is one or more orders of magnitude higher than possible with the design of FIG. 1. In addition, demanding ion focusing properties, such as weak dependence on ion energy, angular spread and/or beam size are possible.

Figure 3B:
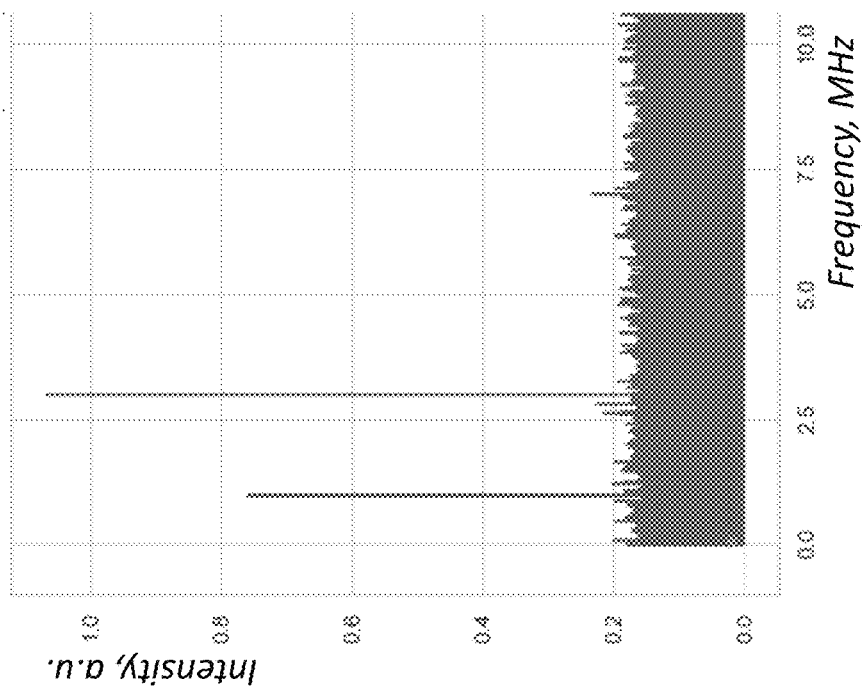
FIG. 3B depicts a simulated frequency spectrum from a single positive charge oscillating within the µEST of FIG. 2 with thermal noise.
Figure 3A:
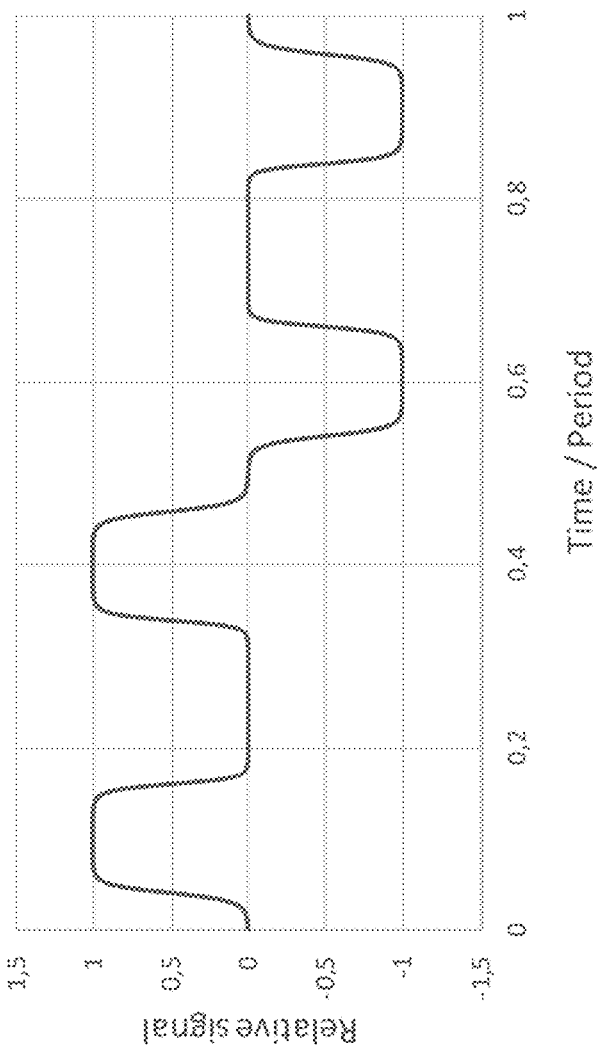
FIG. 3A plots an example signal induced on the detection electrodes of the µEST of FIG. 2 without noise.

Referring now to FIG. 3A, there is plotted an example signal induced on the detection electrodes of the μEST of FIG. 2 without noise. Reference is also made to FIG. 3B, in which there is depicted a simulated frequency spectrum from a single positive charge oscillating within the μEST of FIG. 2 with thermal noise. From these plots, the strongly anharmonic nature of oscillations can be seen, resulting in first and third harmonics of the signal having similar amplitudes. Consequently, every ion could be detected at one or both of these frequencies, beneficially with signal-to-noise ratio high enough to determine its charge from either harmonic. Such a signal could be obtained with low-capacitance JFET transistors wire-bonded on the wafer (substrate), or with transistors manufactured in a single CMOS process with the wafer. With top and bottom wafer separated by precision spacers, the first stage of amplification could take place on one or both wafers. Discrepancy between separations provided by spacers for the same trap is preferably less than 5%, 2%, 1% and most preferably at or no more than 0.5% or 0.2% of the ion beam size (for instance, largest cross-section dimension, which in this example is about 40% of the gap between wafers, h). If the beam size is unknown, this range may correspond to roughly at least 0.1% and no more than 2% of the gap between wafers (h).

For trap sizes considered in this disclosure, this may correspond to a parallelism of 0.1 µm to 1 µm.

In one advantageous implementation, opposing detector plates can be connected by conductive precision spacers. These may be structured by MEMS processes, for example in proximity to the sensitive areas. In this case, one readout circuit may be used for a single detector cell. Where non-conductive spacers are used, two separate read out circuits may be required for the upper and lower substrate of a single detector cell. The signals can be added electrically after amplification in this case.

Figure 4:
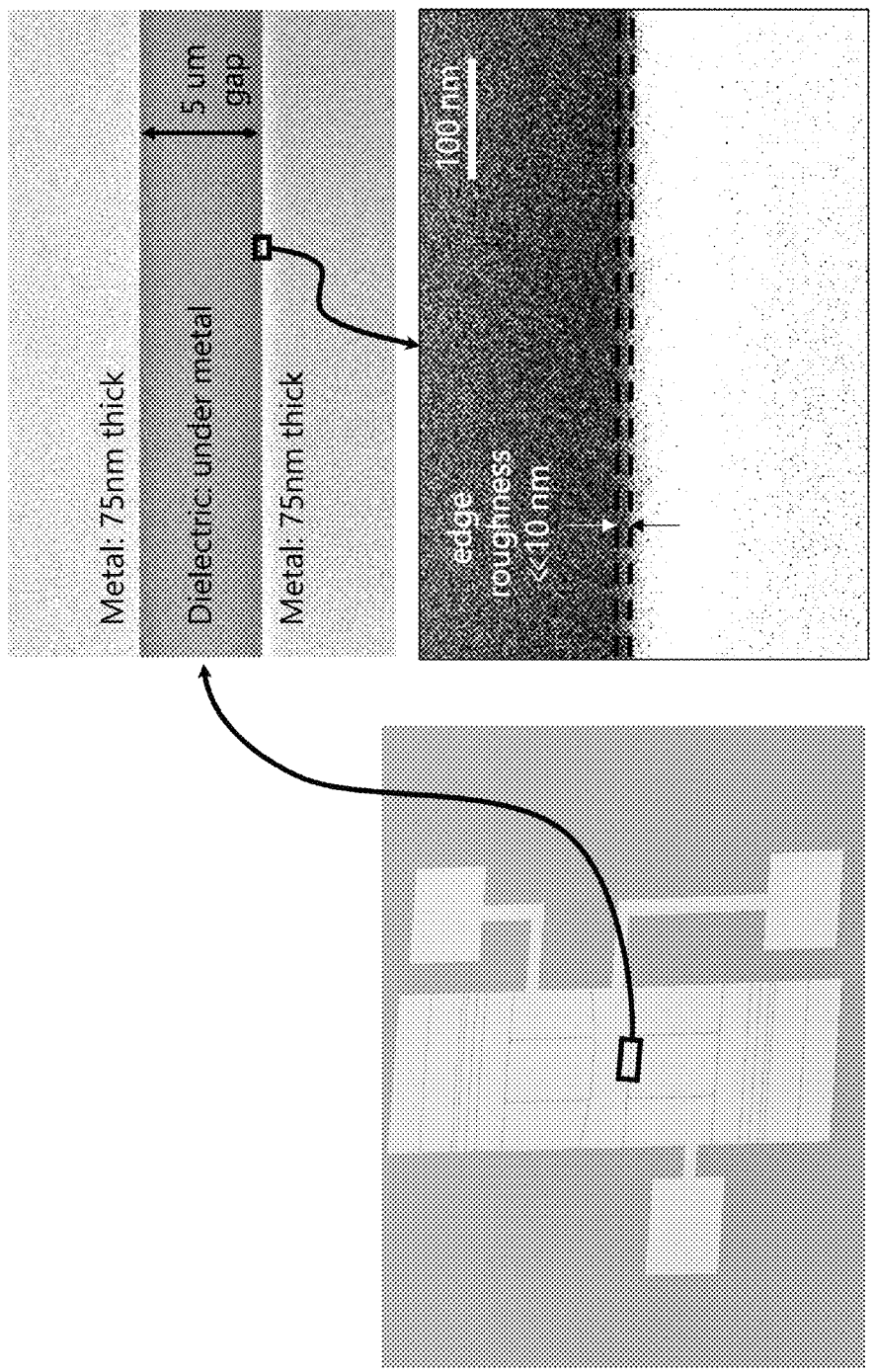
FIG. 4 illustrates an example wafer having electrodes formed thereupon at different levels of magnification, showing an edge roughness of significantly less than nm.

High resolution and mass accuracy can be provided by high-order time-of-flight focusing within the electrostatic trap, combined with a nanometer-scale accuracy of manufacturing on a planar wafer. Referring to FIG. 4, there is illustrated an example wafer having electrodes formed thereupon at different levels of magnification, showing an edge roughness of significantly less than 10 nm. This may be achieved more easily for very thin metallization, for instance of around 75 nm as shown in FIG. 4. A high fidelity of edge definition by lithographic techniques may determine the ion-optical quality of the µEST, the ultimate mass accuracy and mass resolution. Generally, a ratio of the gap size between wafers to an accuracy of edges of gaps between electrodes (specifically between reflecting electrode R and accelerating electrode A and/or between accelerating electrode A and detection electrode D) should be at least 1000, preferably at least 2000, 5000 or 7000 and most preferably at least or greater than 10000, 20000 or 50000. It is also desirable that both wafers are well aligned, particularly within at most 2% of the ion beam size and preferably within at most 0.5% of the ion beam diameter (which in the example of the disclosure is about 40% of the gap between wafers, h). For trap sizes considered in this disclosure, this corresponds to an alignment accuracy of 0.1 µm to 1 µm.

Mass accuracy in the range of several parts per million may allow narrowing down the list of candidate compounds (for instance, peptides in bottom-up proteomics) from existing databases.

Returning to the general sense of the disclosure discussed above, further optional features may be considered. For example, one or both edges of at least some of the electrodes (on a side of the electrode extending perpendicular to the longitudinal axis, that is in the width dimension) may have an arc shape (and optionally, both edges may have arc shapes, for instance defined by the same circle, or the edges may have arc shapes defined by different circles). Additionally or alternatively, at least some of the electrodes may have a curved shape, an arc shape (for example, this may be applied to reflecting electrodes) or a circular or elliptical shape (for example, applied to detecting electrodes, which may be based on two circular arcs). This may apply to electrodes only on one side of a center of the electrostatic trap along the longitudinal axis (z=0 line).

A central electrode may be provided between the central detection electrodes. The central electrode may be configured to act as an ion lens. Preferably, the central electrode has at least one curved edge (in the width dimension).

In embodiments, a transistor (for instance, a FET or JFET) is connected to the detection electrode (or electrodes). Advantageously, the transistor may be formed by lithographic techniques and/or form part of the integrated circuit. Preferably, the transistor is wire bonded onto or integrated with the substrate, for instance by a CMOS manufacturing process. A capacitance of the transistor is preferably comparable (for example, within one order of magnitude) of a capacitance between detection electrodes and/or the capacitance between a detection electrode and ground.

Where one or more spacers are provided between the sets of electrodes, at least one of the one or more spacers may be conductive, for coupling of at least one electrode on the first set of electrodes with at least one electrode on the second set of electrodes (for example, detection electrodes of each set). A parallelism of 0.1 µm to 1 µm for the spacers is preferred.

In some implementations, ions may be selected by application of a pulsing voltage to one of the reflecting electrodes, thereby causing at least some ions (for instance, unwanted ions) to leave the trap.

Beneficially, a ratio of the gap size between planar substrates to an accuracy of edges of a gap between adjacent electrodes of the first set and/or the second set is at least 1000, preferably at least 2000, 5000 or 7000 and most preferably at least or greater than 10000, 20000 or 50000. Additionally or alternatively, alignment of the planar substrates may be within an accuracy of 0.1 µm to 1 µm.

Further specific details will again be discussed, before returning to the general sense of the disclosure.

Fragmentation of ions in a µEST is possible by irradiation techniques, which may be adapted to the planar geometry of the µEST. Referring next to FIG. 5, there is schematically depicted a µEST in three consecutive steps of operation: a) precursor analysis; b) selection and fragmentation; and c) fragment analysis. This represents a simple form of multi-stage analysis. In step a), the ion trajectory 45 is a normal confinement pattern, as described above with reference to FIG. 1A. This allows analysis of precursor ions. In step b), the ion trajectory 46 is affected by irradiation by a focused Ultraviolet (UV) or Infrared (IR) laser pulse until the ion fragments form (as will be discussed below). The resulting fragments resume a confinement trajectory 48 in the µEST and are re-analyzed in step c). Repetition of steps b) and c) enables MS$^n$ operation.

UV photodissociation is frequently used in conventional mass spectrometry (see for example WO-2007/109672). Advantageously, it could be used to provide additional structural information about ions within µESTs. Ions of interest could optionally be selected in step b) by pulsing down a voltage applied to an upper reflecting electrode of the µEST to allow all unwanted ions to leave the trap (shown by the pulse voltage added to $U_6$ in FIG. 2A). When an ion of interest reaches a turning point 47, it is subjected to a focused pulse of UV light (for example, from a 213 nm Nd:YAG or a 193 nm ArF laser). A timing of the UV pulse could be matched to the trajectory of the target ion for better selectivity. Alternatively, the timing could be unsynchronized, but multiple pulses could then be used to increase the irradiation probability of the ion of interest (preferably to 100%). A UV laser pulse of a few nanoseconds in duration can readily produce fragmentation of most biologically relevant organic molecules (for instance, see J. S. Brodbelt, et al., Chem. Rev. 120, 3328 (2020)). IR can be used instead of UV. As noted above, the process of selection and fragmentation could be repeated several times (MS$^n$ approach), for example depending on probability of formation and capture of charged fragments. Fragmentation in the turning point may offer the advantage of minimizing initial energy of fragment ions, therefore reducing energy spread and improving analysis accuracy.

Again considering the general sense of the disclosure, further advantageous features may be considered. For example, the electrostatic ion trap may further comprise a UV or IR laser, configured to emit a pulse at a trapping region of the electrostatic ion trap, to fragment ions confined in the trapping region thereby. Beneficially, the laser may be configured to emit the pulse in a direction orthogonal to longitudinal axis of the electrostatic ion trap. In some embodiments, the laser is configured to emit a single laser pulse with timing matched to a trajectory of a target ion. Alternatively, the laser may be configured to emit multiple laser pulses unsynchronized to a trajectory of a target ion.

The laser may be controlled for fragmentation of ions in the trapping region. Then the controller or processor may receive a signal from the detection electrodes for detection of ions fragmented in the trapping region. Preferably, detection and/or selection of ions is additionally performed before fragmentation.

Another embodiment of fragmentation could include the same UV laser used to illuminate the surface of electrodes 22, to emit electrons via photoeffect. This may allow other methods of fragmentation of general electron dissociation (ExD) type, for example electron-capture dissociation (ECD), electron-induced dissociation (EID), etc. A weak magnetic field from external permanent magnets could be added to increase residence time of electrons in the trap and hence efficiency of fragmentation.

In particular implementations, the electrostatic ion trap may be controlled to effect repetition of fragmentation and detection. $MS^n$ operation may be provided in the electrostatic ion trap thereby. Optionally, fragmentation may be controlled in response to information determined from a previous detection. Data-dependent decision ion fragmentation may be effected in this way.

Additional details of specific embodiments will again be discussed, before further discussion of the general sense of the disclosure.

The design of µEST at a small scale and particularly on a substrate, for instance a wafer, allows placement of a respective set of electrodes for each of a plurality of traps on a single wafer. Using two such wafers, a two-dimensional array of traps may be created. Using three or more wafers stack in multiple levels may thereby provide multiple such two-dimensional arrays and permit a three-dimensional array of µESTs. In this way, a large number of µESTs may be provided within a small volume, thereby making massively parallel operation possible.

Figure 6:
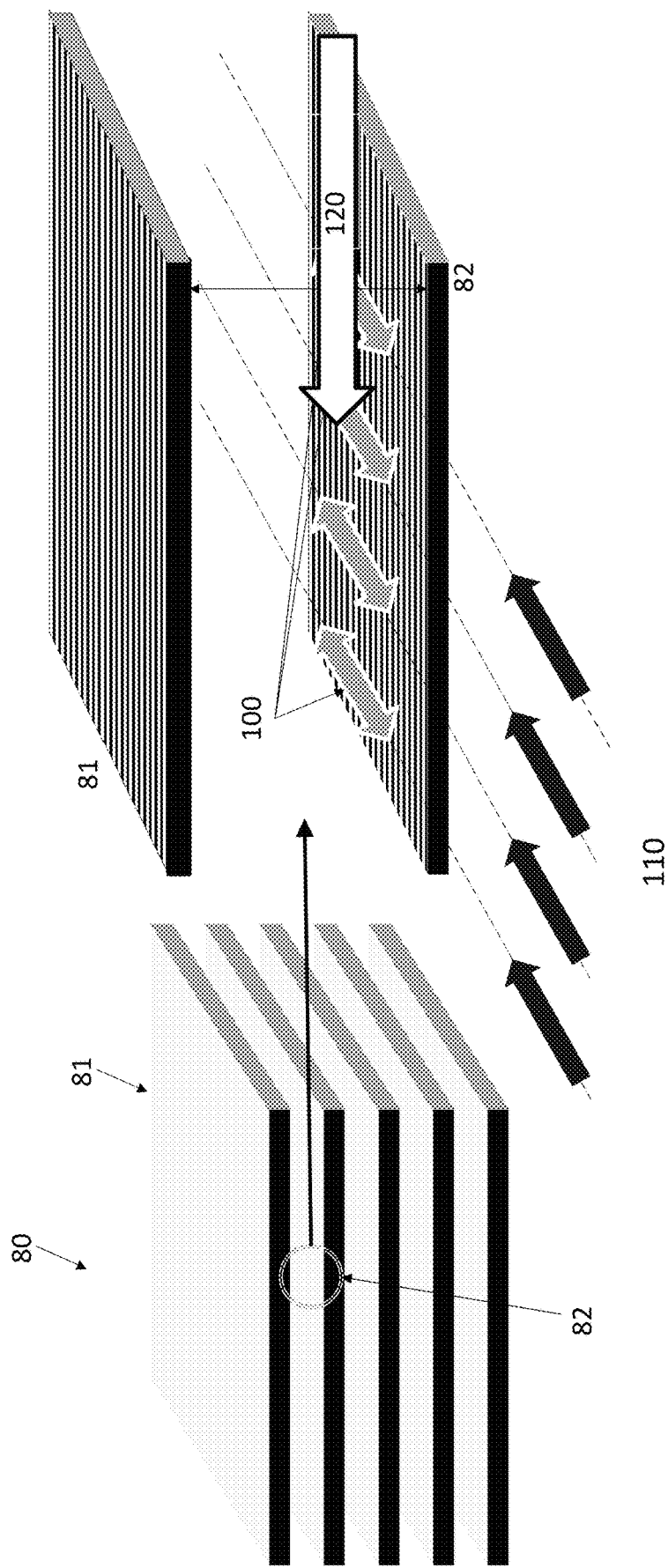
FIG. 6A shows a stack of wafers comprising a plurality of µESTs.
FIG. 6B depicts a magnified portion of FIG. 6A to demonstrate ion fragmentation by irradiation according to an implementation.

Referring next to FIG. 6A, there is shown a stack of wafers comprising a plurality of µESTs. Each of the wafers may have electrodes formed on both top and bottom sides, along the lines discussed above. The stack 80 includes a first wafer 81 and an adjacent second wafer 82, separated by a height of 50 µm.

Reference is now made to FIG. 6B, depicting a magnified portion of FIG. 6A to demonstrate ion fragmentation by irradiation according to an implementation. Multiple ion confinement areas 100 are illustrated, each of which is defined by a respective µEST comprising individual electrodes formed on the wafers. Ions enter each of the µESTs along axes 110 from the edge of wafers (which are also longitudinal axes of each µEST). Thus, N µESTs may be provided in a single row. A laser pulse 120 is directed along the plane of the ion confinement in a direction perpendicular to the axes 110 of ion entry. In this way, a single laser pulse 120 can be used to fragment ions in multiple µESTs simultaneously.

Figure 7:
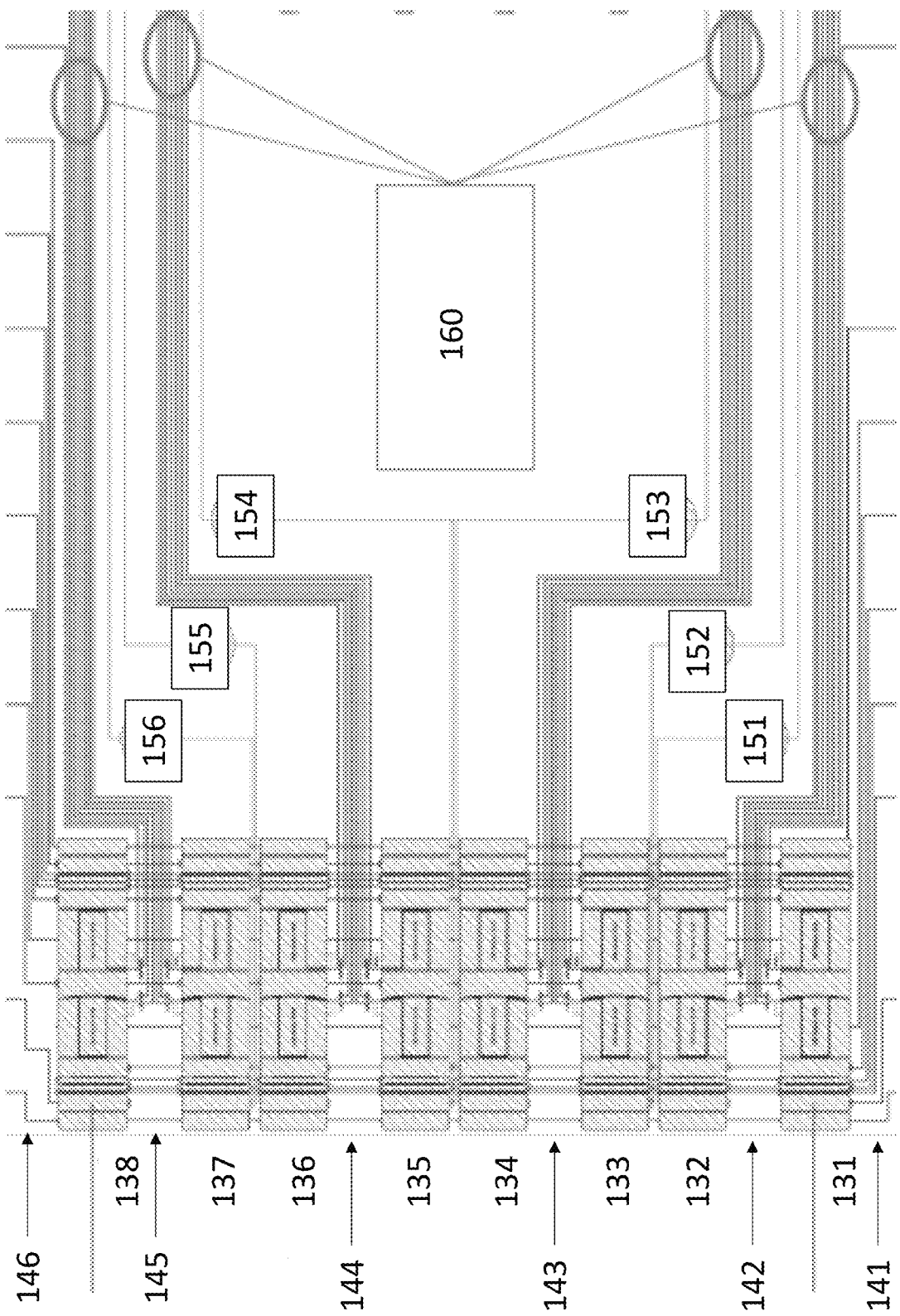
FIG. 7 shows a schematic layout of a wafer and electrical connections for a single row of traps within an array.

For an array of N traps in a row with M rows above each other, a single laser pulse could be split in M sub-rays, each of them focused by an array of miniature lenses with anti-reflective coating into collimated beam. With N=10 to 20, traps span over 5 to 10 mm and the diameter of the beam could be kept within the required 20 to 30 um along all this length and without touching electrodes. Angular divergence should be within around ±1 mrad to achieve this. With a fragmentation threshold for peptides of 1 mJ/mm², less than 1 µJ of pulse energy per row may be required, although with tight collimation. Reference is next made to FIG. 7, in which there is shown a schematic layout of a wafer for a single row of traps within an array. Eight traps are shown, comprising: a first trap 131; a second trap 132; a third trap 133; a fourth trap 134; a fifth trap 135; a sixth trap 136; a seventh trap 137; and an eighth trap 138. Each of these traps is spaced apart from each other, preferably with at least (or greater than) 6$h$ distance between their longitudinal axes, most preferably at least (or greater than) 10$h$ distance, where h represents the spacing between wafers (in other words, the height of the trap). As fringing fields exponentially reduce when moving from the trap longitudinal axis, anything at least about 3 h away from the ions on the z-axis is unlikely to affect the field. For these reasons, for example transistors for image current detection, wires or similar can be so placed.

Also shown in FIG. 7 are wires for connection to the traps. In particular, DC voltage wires 141, 142, 143, 144, 145 and 146 provide DC voltages to and between the traps (smaller, similar connection wires are provided between adjacent traps, but these may not clearly be visible from the drawing). Pulsed signal wires 151, 152, 153, 154, 155 and 156, provide pulsed signals to the traps (similar wires to provide pulsed signals to other traps are present but not highlighted). Output signal lines 160 (connected to the drain and source of the detection JFETs) are also indicated.

Following standard mass spectrometry notation (for instance, see P. Roepstorff, J. Fohlman, Biomed. Mass Spectrom. 11(11), 601(1984)), the majority of UVPD fragments for tryptic peptides are a- and y-ions, followed by x- and z-species. Low energy charged fragments formed during this pulse are typically accelerated back to the µEST from the turning points, while uncharged fragments and unselected precursors are lost from analysis. Following capture of charged fragments in the µEST and their accurate mass measurement, vital structural information (sequence tags) about the ion of interest could be deduced to pinpoint the correct compound (for example, peptide) against the candidates from a library that may be short-listed after filtering on precursor mass.

For MS/MS and $MS^n$ approaches using µESTs, modification of the existing tools used in conventional mass spectrometry may be desirable. First, increased ambiguity may be caused by the presence of only one isotope in the spectrum, resulting in an unknown isotope abundance (for instance, with $^{13}C$ or $^{15}N$). With multiple traps and higher throughput, the identification process may greatly benefit from applying statistical and/or machine learning methods. The use of chromogenic tags appended to peptides can also be considered to increase the identification rate. TMT and TMTPro reporter ions could be used for analyzing pooled samples.

The output of each µEST in an array may be individually digitized and processed. This permits mass/intensity pairs to be extracted. Intensities can be converted into an integer number of charges (charge state) of the ion. This allows determination of the mass from m/z measurement with low ppm accuracy. Data from MS/MS and/or $MS^n$ can be linked to the single stage (MS) data of the precursor. This data may then be used for a search (for example in a database).

It is likely that only one isotopologue will be detected per trap. Moreover, the average number of fragments will typically be lower than in conventional (macro-scale) mass spectrometry. Hence, the search space for any output data will generally be wider than in conventional proteomic analysis. In contrast, the ability to link fragments directly to precursors (since the precursor will be a single ion) may reduce the search space compared with macro-scale proteomic analysis. Data from other traps could be also taken into account, for example using machine learning to identify precursors better.

The μEST may even be useful without fragmentation. For example, this may be useful if a particular sample can have different charge states for the same mass-to-charge ratio, m/z, for instance in the case of analysis of intact proteins and top-down proteomics. In a general sense of the disclosure (which may be combined with, or a part of the general senses discussed above), there may be considered an array of electrostatic ion traps, each ion trap having a longitudinal length of no more than 10 mm and/or with a at least one of electrode (preferably, one, some or all detection electrodes) having a low capacitance to ground, generally no more than 1 pF (and optionally lower, as identified above). The longitudinal length may optionally be no more than 5 mm, 2 mm, 1 mm or 0.5 mm. Advantageously, the array comprises an inlet for receiving an ion beam, configured such that a portion of the ion beam can be trapped in each of the ion traps. A controller and/or processor may be provided to control operation of the array and/or to receive one or more outputs from the array. Also, a corresponding method of manufacturing and/or operating such an array of electrostatic ion trap may also be considered, having steps of forming and/or providing and/or using the features of this device.

In an aspect, there may be considered a method of analyzing an ion beam comprising a mixture of different analyte ions. The method comprises: directing ions from the ion beam to multiple electrostatic ion traps of an array of electrostatic ion traps (for example, the array as discussed above and elsewhere herein, optionally comprising any features of the electrostatic ion traps herein described), each electrostatic ion trap having a longitudinal length of no more than 10 mm; obtaining signals indicative of mass and charge data in respect of the ions from said multiple electrostatic ion traps; and combining the mass and charge data obtained from the signals for identification of components of the mixture. The ion beam may be generated from a mixture of analytes.

The signals are advantageously obtained by analyzing the ions and/or derivatives of the ions. For example, the ions or their derivatives in each trap may be considered precursor ions. Then, the precursor ions may be fragmented in the multiple traps to obtain fragment ions. The obtaining signals may include obtaining signals by analyzing the precursor ions in the multiple traps and/or obtaining signals by analyzing the fragment ions in the multiple traps. Then, the combining the mass and charge data may combine mass and charge data in respect of the precursor ions and/or mass and charge data in respect of the fragment ions. Beneficially, the steps of fragmenting, obtaining signals and combining the mass and charge data are repeated in sequence (to effect $MS^n$ operation).

Obtaining signals may comprise simultaneously analyzing ions in each of the multiple traps. This may include simultaneous analysis of one set of ions in the multiple traps and/or simultaneous analysis of fragment ions in the multiple traps. Simultaneous fragmentation of ions in the multiple traps is also possible.

In line with this method aspect (and any other method aspect provided herein), a computer program may be provided, comprising instructions that, when executed by a processor, cause the processor to perform the corresponding method. For instance, the processor may be configured to control an array of electrostatic ion traps (or a mass spectrometer comprising such an array). A (non-transitory) computer readable medium comprising or storing thereon such a computer program may also be provided.

Various options will now be considered according to any of the above aspects and/or implementations. For example, each electrostatic ion trap may be (and preferably is) in accordance with any of those described above. For example, the electrostatic ion trap may comprise: a first set of planar electrodes distributed along a longitudinal axis of the respective ion trap; and a second set of planar electrodes distributed along the longitudinal axis of the respective ion trap, each of the electrodes of the second set arranged to be spaced apart from and oppose a corresponding electrode of the first set. A length of the first and second sets of planar electrodes along the longitudinal axis is no more than 10 mm and/or at least one electrode (preferably, a detection electrode) may have a capacitance to ground of no more than 1 pF (and optionally lower, as identified herein). At least some of the electrodes of the first and second sets may be configured to receive an electrostatic potential for confinement of ions received in the space between the first and second sets of planar electrodes.

In some embodiments, the array is configured with multiple electrostatic ion traps in the same plane. Additionally or alternatively multiple electrostatic ion traps may be provided in distinct planes. Where multiple electrostatic ion traps are provided in the same plane, a single laser pulse may be used to fragment ions in multiple electrostatic ion traps (specifically, their respective trapping regions) in that plane. A single laser pulse may also be used to fragment ions confined in different planes. For example, a UV or IR laser may be provided, configured to generate a pulse. Then, a splitter arrangement may be configured to split the generated pulse spatially into parts and to direct each part along a respective, different plane. A lens array comprising a plurality of (miniature) lenses may be used. Each lens is beneficially configured to focus a respective part of the generated pulse into a respective collimated beam. Anti-reflective coating may be applied to the lenses. Ions may be received beam at multiple electrostatic ion traps of the array from a single ion. The received ions at the multiple electrostatic ion traps may be processed in parallel (particularly, where the ion beam comprises ions of a peptide).

Detection outputs from each of the multiple electrostatic ion traps may be provided to a processor. The processor may then be configured to apply statistical and/or machine-learning methods to the detection outputs for identification of a composition of the single ion beam.

Ions may be injected to multiple electrostatic ion traps of the array from the same calibration mixture, for calibration of the multiple electrostatic ion traps.

An ion beam may be transmitted to at least one electrostatic ion trap of the array, the ion beam including at least one ion with a chromogenic tag or a tandem mass tag.

Figure 8:
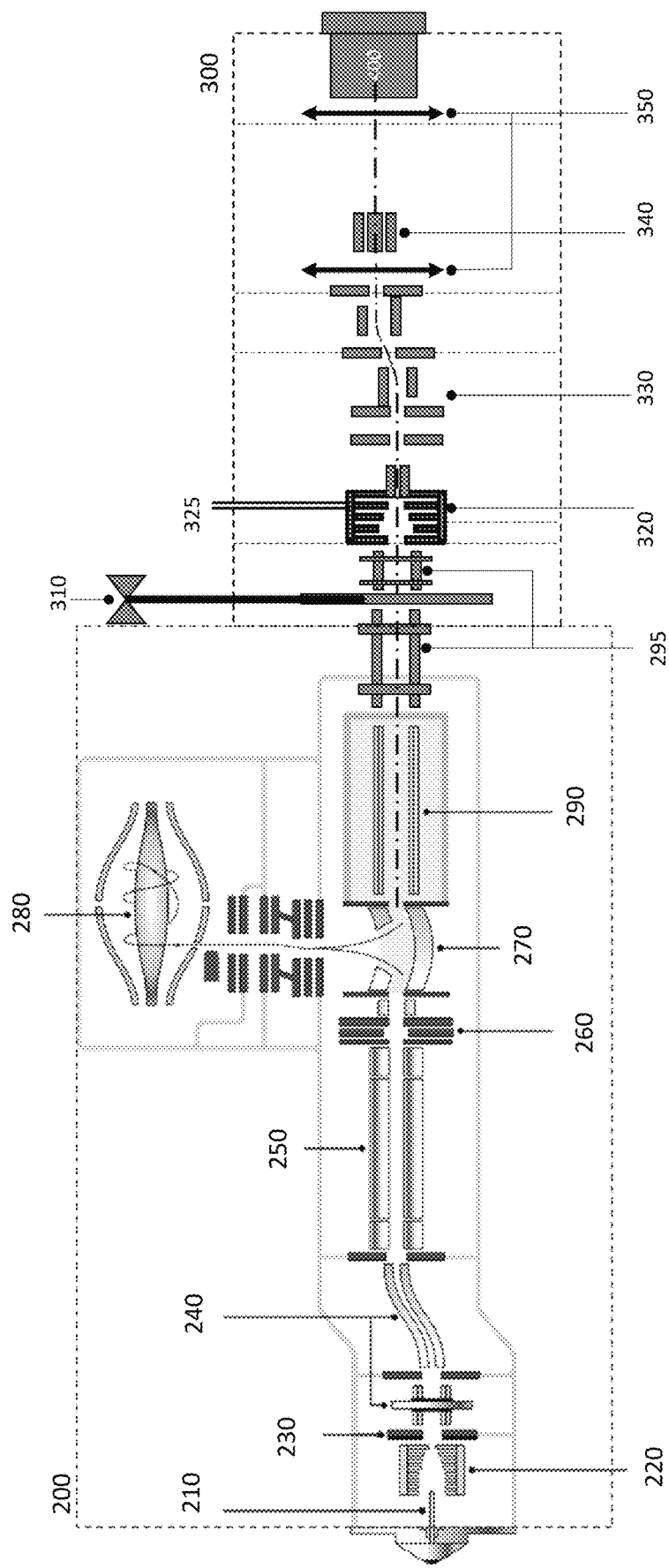
FIG. 8 illustrates a schematic diagram of an experimental apparatus used for testing and using a µEST array.

Referring next to FIG. 8, there is illustrated a schematic diagram of an experimental apparatus used for testing a μEST array. This comprises: an existing macroscale mass spectrometer 200 (marketed under the name of Orbitrap™ Exploris™ 480 instrument by Thermo Fisher Scientific, Inc.) as a front-end instrument; an adaptor chamber 300; and a μEST array 400. The macroscale mass spectrometer 200 comprises: a high capacity transfer tube 210; an electrodynamic ion funnel 220; an internal calibrant source 230; an active beam guide 240; a quadrupole mass filter 250; an ion gate 260; a curved ion trap (C-trap) 270; an orbital trapping mass analyzer 280; an ion routing multipole 290; and a transport multipole 295.

The adaptor chamber 300 comprises: a gate valve 310; an ion funnel 320 with a gas line 325; a Z-lens (line-of-sight blocker) 330; a X, Y deflector 340; and lenses 350.

Prior to analytical runs, each μEST may be calibrated using the same calibration mixture as the front-end instrument. In operation, the internal calibrant of the mass spectrometer from source 230 may be used to monitor the mass accuracy of each trap within the array and, if needed, employed as a lock mass.

In operation, each μEST is filled sequentially (although parallel fill is possible), for example in a raster. This may be achieved by pulsing of the reflecting electrode to receive an ion of a particular m/z ratio (as discussed above with reference to FIG. 2, with the pulse added to the $U_6$ potential). Each μEST can thus be used to detect a single charge (due to its small size).

Single ion sensitivity even at high repetition rate allows the μESTs to measure even very low abundance species within a mixture. This, in turn, may enable deeper proteome coverage or similar. On the other hand, the small size of the μEST, which makes such ultra-sensitive detection possible, may also limit the number of ions analyzed to a maximum of few tens per injection.

Although embodiments according to the disclosure have been described with reference to particular types of devices and applications (particularly mass spectrometry) and the embodiments have particular advantages in such case, as discussed herein, approaches according to the disclosure may be applied to other types of device and/or application. In particular, the devices according to the disclosure may be used for other applications. The specific structure, arrangement and operational details (for example, parameters) of the μEST and/or array of μESTs, whilst potentially advantageous (especially in view of known configurations and capabilities), may be varied significantly to arrive at modes of operation with similar or identical performance. The scale of the μEST could also vary widely, for example from nanometer to millimeter range. Certain features may be omitted or substituted, for example as indicated herein. Each feature disclosed in this specification, unless stated otherwise, may be replaced by alternative features serving the same, equivalent or similar purpose. Thus, unless stated otherwise, each feature disclosed is one example only of a generic series of equivalent or similar features.

In this detailed description of the various embodiments, for the purposes of explanation, numerous specific details are set forth to provide a thorough understanding of the embodiments disclosed. One skilled in the art will appreciate, however, that these various embodiments may be practiced with or without these specific details. Furthermore, one skilled in the art can readily appreciate that the specific sequences in which methods are presented and performed are illustrative and it is contemplated that the sequences can be varied and still remain within the scope of the various embodiments disclosed herein.

Although FIG. 1A shows a basic design for a μEST, some modifications are possible. For example, it may not be necessary to have two detection electrodes on each substrate. In one alternative approach, detection electrodes may be provided on only one substrate. The detected signal may be halved as a result of this, but the capacitance is also lowered (which may affect noise pickup), so signal-to-noise may only be reduced by $\sqrt{2}$. As a further alternative, a single detection electrode could be used. This is less preferred, since two electrodes are better for differential detection and common-mode rejection.

The number and positioning of the accelerating electrodes and/or reflecting electrodes may be varied. It is expected that at least one accelerating electrodes and at least one reflecting electrode is used on each side (in the z-dimension) of each set of electrodes (that is, four accelerating electrodes and four reflecting electrodes). It may be possible to use fewer accelerating electrodes than this in some configurations. With a different design of μEST, it may also be possible to reduce the number of reflecting electrodes.

A wide variety of manufacturing technology can be used, including: glass on silicon, cryogenic silicon, wafer polishing, accurate alignment techniques and similar.

Variation of the μEST shown with reference to FIG. 2 may also be considered. For example, the number of electrodes and/or the potentials applied may be changed significantly. Curvature of the electrodes in the design of FIG. 2 is only on the electrodes in the z<0 part (left side), but in some implementations, the other electrodes (on the z>0 or right side) could be curved. The number of possible variations on this basic design is essentially infinite.

As used herein, including in the claims, unless the context indicates otherwise, singular forms of the terms herein are to be construed as including the plural form and vice versa. For instance, unless the context indicates otherwise, a singular reference herein including in the claims, such as "a" or "an" (such as an ion multipole device) means "one or more" (for instance, one or more ion multipole device). Throughout the description and claims of this disclosure, the words "comprise", "including", "having" and "contain" and variations of the words, for example "comprising" and "comprises" or similar, mean "including but not limited to", and are not intended to (and do not) exclude other components. Also, the use of "or" is inclusive, such that the phrase "A or B" is true when "A" is true, "B is true", or both "A" and "B" are true.

The use of any and all examples, or exemplary language ("for instance", "such as", "for example" and like language) provided herein, is intended merely to better illustrate the disclosure and does not indicate a limitation on the scope of the disclosure unless otherwise claimed. No language in the specification should be construed as indicating any non-claimed element as essential to the practice of the disclosure.

The terms "first" and "second" may be reversed without changing the scope of the disclosure. That is, an element termed a "first" element may instead be termed a "second" element and an element termed a "second" element may instead be considered a "first" element.

Any steps described in this specification may be performed in any order or simultaneously unless stated or the context requires otherwise. Moreover, where a step is described as being performed after a step, this does not preclude intervening steps being performed.

It is also to be understood that, for any given component or embodiment described herein, any of the possible candidates or alternatives listed for that component may generally be used individually or in combination with one another, unless implicitly or explicitly understood or stated otherwise. It will be understood that any list of such candidates or alternatives is merely illustrative, not limiting, unless implicitly or explicitly understood or stated otherwise.

All literature and similar materials cited in this disclosure, including but not limited to patents, patent applications, articles, books, treaties and internet web pages are expressly incorporated by reference in their entirety for any purpose. Unless otherwise described, all technical and scientific terms used herein have a meaning as is commonly understood by one of ordinary skill in the art to which the various embodiments described herein belongs.

The invention claimed is:
1. An electrostatic ion trap, comprising:
a first set of planar electrodes distributed along a longitudinal axis;
a second set of planar electrodes distributed along the longitudinal axis, each of the electrodes of the second set arranged to be spaced apart from and oppose a corresponding planar electrode of the first set;
wherein at least some of the planar electrodes of the first and second sets are configured to receive an electrostatic potential for confinement of ions received in a space between the first and second sets of planar electrodes; and
wherein the first and second sets of planar electrodes extend along the longitudinal axis no more than 10 mm and/or wherein a capacitance of at least one of the electrodes to ground is no more than 1 pF.

2. The electrostatic ion trap of claim 1, wherein at least one of the electrodes is a detection electrode, configured to detect an image current of confined ions and wherein the capacitance of the detection electrode to ground is no more than 1 pF.

3. The electrostatic ion trap of claim 2, wherein:
some of the electrodes are reflecting electrodes, configured to receive a reflecting potential, located at ends of the ion trap along the longitudinal axis; and
some of the electrodes are accelerating electrodes, configured to receive an accelerating potential, located between the reflecting electrodes and the detecting electrodes along the longitudinal axis.

4. The electrostatic ion trap of claim 3, wherein the potentials on the reflecting electrodes are configured selectively to be at: a lower level, to allow ions to enter the ion trap;
and a higher level, to confine the ions to the ion trap.

5. The electrostatic ion trap of claim 1, wherein the first set of electrodes are formed on a first planar substrate and the second set of electrodes are formed on a second planar substrate opposing the first planar substrate.

6. The electrostatic ion trap of claim 1, wherein a gap between adjacent electrodes is no more than 100 μm.

7. The electrostatic ion trap of claim 1, wherein the first and second planar substrates form part of an integrated circuit or wherein the first and second sets of planar electrodes are manufactured by lithographic techniques.

8. The electrostatic ion trap of claim 1, wherein the arrangement of the first set of electrodes is substantially symmetrical between opposite sides of a center of the electrostatic trap along the longitudinal axis and wherein the arrangement of the second set of electrodes is substantially symmetrical between opposite sides of a center of the electrostatic trap along the longitudinal axis.

9. The electrostatic ion trap of claim 1, wherein one or both edges of at least some of the electrodes has an arc shape or at least some of the electrodes have a curved shape, an arc shape, a circular shape or an elliptical shape.

10. The electrostatic ion trap of claim 2, further comprising a transistor connected to the detection electrode.

11. The electrostatic ion trap of claim 1, further comprising one or more spacers between the first and second sets of planar electrodes.

12. The electrostatic ion trap of claim 11, wherein at least one of the one or more spacers is conductive, for coupling of at least one electrode on the first set of electrodes with at least one electrode on the second set of electrodes.

13. The electrostatic ion trap of claim 1, wherein the electrostatic ion trap is configured such that one or more of: a measurement time is no more than 20 ms; an acceleration voltage is no more than 200V; and a gas pressure within the electrostatic ion trap is no more than $10^{-7}$ mbar.

14. The electrostatic ion trap of claim 1, configured to receive no more than 100 ions injected into the electrostatic ion trap.

15. The electrostatic ion trap of claim 3, configured to select ions by application of pulsing voltage to one of the reflecting electrodes, thereby causing at least some ions to leave the trap.

16. The electrostatic ion trap of claim 1 further comprising:
a UV or IR laser, configured to emit a pulse at a trapping region of the electrostatic ion trap, to fragment ions confined in the trapping region thereby.

17. The electrostatic ion trap of claim 16, wherein the laser is configured to emit the pulse in a direction orthogonal to longitudinal axis of the electrostatic ion trap.

18. The electrostatic ion trap of claim 16, wherein the laser is configured: to emit a single laser pulse with timing matched to a trajectory of a target ion; or to emit multiple laser pulses unsynchronized to a trajectory of a target ion.

19. The electrostatic ion trap of claim 16, further comprising:
a controller, configured to control the laser for fragmentation of ions in the trapping region and to receive a signal from detection electrodes for detection of ions fragmented in the trapping region.

20. The electrostatic ion trap of claim 19, wherein the controller is further configured to control repetition of fragmentation and detection, to provide MS" operation in the electrostatic ion trap thereby.

21. The electrostatic ion trap of claim 20, wherein the controller is configured to control fragmentation in response to information determined from a previous detection.

22. An array of electrostatic ion traps, each ion trap of the array of the ion traps extending along a respective axis no more than 10 mm and/or at least one electrode with a capacitance to ground of no more than 1 pF, the array comprising an inlet for receiving an ion beam, configured such that a portion of the ion beam can be trapped in each of the ion traps.

23. The array of claim 22, wherein each electrostatic ion trap comprises:
a first set of planar electrodes distributed along a longitudinal axis of the respective ion trap;
a second set of planar electrodes distributed along the longitudinal axis of the respective ion trap, each of the electrodes of the second set arranged to be spaced apart from and oppose a corresponding electrode of the first set;
wherein at least some of the electrodes of the first and second sets are configured to receive an electrostatic potential for confinement of ions received in a space between the first and second sets of planar electrodes; and
wherein a length of the first and second sets of planar electrodes along the longitudinal axis is no more than 10 mm and/or at least one of the electrodes of the first and second sets has a capacitance to ground of no more than 1 pF.

24. The array of claim 22, wherein the array is configured with multiple electrostatic ion traps in the same plane and/or with multiple electrostatic ion traps in distinct planes.

25. The array of claim 22, further comprising:
a UV or IR laser, configured to generate a pulse;
a splitter arrangement, configured to split the generated pulse spatially into parts and to direct each part along a respective, different plane; and
a lens array comprising a plurality of lenses, each lens being configured to focus a respective part of the generated pulse into a respective collimated beam.

26. The array of claim 22, configured to receive ions from a single ion beam at multiple electrostatic ion traps of the array and to process the received ions at the multiple electrostatic ion traps in parallel.

27. The array of claim 22, further comprising:
a controller, configured to control transmission of an ion beam to at least one electrostatic ion trap of the array, the ion beam including at least one ion with a chromogenic tag or a tandem mass tag.

28. A method of analyzing an ion beam comprising a mixture of different analyte ions, the method comprising:
directing ions from the ion beam to multiple electrostatic ion traps of an array of electrostatic ion traps, each electrostatic ion trap extending no more than 10 mm along an axis of a respective ion trap and/or at least one electrode with a capacitance to ground of no more than 1 pF;
obtaining signals indicative of mass and charge data in respect of the ions from the multiple electrostatic ion traps; and
combining the mass and charge data obtained from the signals for identification of components of the mixture.

29. The method of claim 28, further comprising:
fragmenting precursor ions in said multiple electrostatic ion traps to obtain fragment ions;
wherein the step of obtaining signals indicative of mass and charge data comprises obtaining signals by analyzing the precursor ions in said multiple electrostatic ion traps and/or obtaining signals by analyzing the fragment ions in said multiple electrostatic ion traps; and
wherein the step of combining the mass and charge data comprises combining the mass and charge data in respect of the precursor ions and/or mass and charge data in respect of the fragment ions.

30. The method of claim 29, wherein the steps of fragmenting, obtaining signals and combining the mass and charge data are repeated in sequence.

31. The method of claim 28, wherein the step of obtaining signals comprises simultaneously analyzing ions in each of said multiple electrostatic ion traps.

* * * * *